US012640430B2

(12) United States Patent
Wang et al.

(10) Patent No.: US 12,640,430 B2
(45) Date of Patent: May 26, 2026

(54) CELL STACK SUPPORT FOR A VEHICLE BATTERY CELL

(71) Applicant: GM Global Technology Operations LLC, Detroit, MI (US)

(72) Inventors: Lei Wang, Rochester Hills, MI (US); Fengkun Wang, Rochester Hills, MI (US); Liang Xi, Northville, MI (US); Linan Zheng, Troy, MI (US); SriLakshmi Katar, Troy, MI (US); Arturo Sanchez Perez, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 413 days.

(21) Appl. No.: 18/335,289

(22) Filed: Jun. 15, 2023

(65) Prior Publication Data

US 2024/0421407 A1      Dec. 19, 2024

(51) Int. Cl.
 *H01M 50/249*      (2021.01)
 *B60L 50/64*      (2019.01)
 *H01M 50/233*      (2021.01)
 *H01M 50/264*      (2021.01)
 *H01M 50/30*      (2021.01)

(52) U.S. Cl.
 CPC ........... *H01M 50/249* (2021.01); *B60L 50/64* (2019.02); *H01M 50/233* (2021.01); *H01M 50/264* (2021.01); *H01M 50/30* (2021.01); *H01M 2220/20* (2013.01)

(58) Field of Classification Search
 CPC ...... B60L 50/64; B60L 58/26; H01M 50/249; H01M 50/30; H01M 50/264; H01M 50/233
 See application file for complete search history.

(56) References Cited

U.S. PATENT DOCUMENTS

| 5,639,571 A | * | 6/1997 | Waters | .............. | H01M 10/6563 |
| | | | | | 180/68.5 |
| 7,126,311 B2 | * | 10/2006 | Gottsponer | ......... | H01M 50/262 |
| | | | | | 320/110 |
| 7,682,732 B2 | * | 3/2010 | Kim | .................... | H01M 10/617 |
| | | | | | 429/120 |
| 7,819,215 B2 | * | 10/2010 | Tsuchiya | ............. | H01M 50/204 |
| | | | | | 180/68.5 |
| 8,016,063 B2 | * | 9/2011 | Tsuchiya | .................. | B60K 1/04 |
| | | | | | 180/68.5 |

(Continued)

*Primary Examiner* — Jeffrey J Restifo
(74) *Attorney, Agent, or Firm* — CANTOR COLBURN LLP

(57) ABSTRACT

A battery cell for a vehicle includes a cell can having a first wall, a second wall, a first side wall and a second side wall. The first wall, the second wall, the first side wall, and the second side wall defining an electrode stack receiving zone. A vent is formed in the second wall. The vent is spaced from the first side wall and the second side wall. The vent fluidically connects the electrode stack receiving zone with an exterior of the cell can. An electrode stack is positioned in the electrode stack receiving zone. The electrode stack is spaced from of the first side wall by a channel. A cell stack support is arranged in the electrode stack receiving zone and supporting the electrode stack above the second wall. The cell stack support includes at least one passage that transports gases from the channel to the vent.

19 Claims, 6 Drawing Sheets

(56)　　　　　References Cited

U.S. PATENT DOCUMENTS

| | | | |
|---|---|---|---|
| 8,960,350 B2 * | 2/2015 | Kosaki | H01M 10/44 |
| | | | 180/68.5 |
| 9,627,721 B2 * | 4/2017 | Kosaki | H01M 10/625 |
| 9,908,431 B2 * | 3/2018 | Kirk | H01M 50/224 |
| 10,256,514 B2 * | 4/2019 | Obasih | H01M 10/6551 |
| 12,046,773 B2 * | 7/2024 | Yadav | H01M 50/342 |
| 12,412,954 B2 * | 9/2025 | Hernandez Saab | |
| | | | H01M 50/291 |
| 2004/0232891 A1 * | 11/2004 | Kimoto | H01M 10/625 |
| | | | 320/150 |
| 2009/0197166 A1 * | 8/2009 | Horii | H01M 10/613 |
| | | | 429/176 |
| 2010/0294580 A1 * | 11/2010 | Kubota | H01M 10/625 |
| | | | 180/68.1 |
| 2024/0079716 A1 * | 3/2024 | Reibling | B60L 58/26 |
| 2024/0421407 A1 * | 12/2024 | Wang | H01M 50/233 |
| 2024/0421436 A1 * | 12/2024 | Xi | H01M 50/103 |
| 2025/0141037 A1 * | 5/2025 | Kim | H01M 50/367 |
| 2025/0192350 A1 * | 6/2025 | Lahr | H01M 10/613 |

* cited by examiner

CELL STACK SUPPORT FOR A VEHICLE BATTERY CELL

INTRODUCTION

The subject disclosure relates to the art of rechargeable energy storage systems and, more particularly, to a cell stack support for a rechargeable vehicle battery cell.

Rechargeable energy storage systems (RESS) typically include one or more battery packs having rechargeable energy storage cells. The battery pack is connectable to an external charging system that replenishes electrical energy lost to a load. The charging system may be part of a vehicle, or may be part of an external charging station. When providing power to a vehicle, the battery pack discharges stored electrical energy. Replenishing and discharging the stored electrical energy results in gas generation that is vented from the battery pack.

There is a wide array of systems employed to vent batteries. For example, many batteries will include spacer arranged between a bottom surface of a cell can and an electrode stack. The spacer is typically formed from a heat resistant material. The spacer creates channels in the bottom surface that guide gases to a vent. While existing systems are effective, current spacers limit gas flow and thereby constrict ventilation. Accordingly, the art would welcome a spacer that is more open to gas flow so as to reduce restrictions in ventilation flow.

SUMMARY

A battery cell for a vehicle, in accordance with a non-limiting example, includes a cell can having a first wall, a second wall disposed opposite the first wall, a first side wall extending between and connecting the first wall with the second wall, and a second side wall, positioned opposite the first side wall, extending between and connecting the first wall with the second wall. The first wall, the second wall, the first side wall, and the second side wall defining an electrode stack receiving zone. A vent is formed in the second wall, the vent being spaced from the first side wall and the second side wall. The vent fluidically connects the electrode stack receiving zone with an exterior of the cell can. An electrode stack is positioned in the electrode stack receiving zone. The electrode stack is spaced from of the first side wall by a channel. A cell stack support is arranged in the electrode stack receiving zone supporting the electrode stack above the second wall. The cell stack support includes at least one passage that transports gases from the channel to the vent.

In addition to one or more of the features described herein the cell stack support includes a first member including a first surface and an opposing second surface, the first surface being arranged on the second wall, and a plurality of support members extending from a first end coupled to the second surface to a second end, the at least one passage being defined between adjacent ones of the plurality of support members.

In addition to one or more of the features described herein a second member is connected to the second end of each of the plurality of support members.

In addition to one or more of the features described herein the first member includes a plurality of openings that extend through the first surface and the second surface.

In addition to one or more of the features described herein the cell stack support includes a body having a first surface and a second surface, and the at least one passage being formed in the body substantially perpendicularly to the first surface and the second surface.

In addition to one or more of the features described herein the at least one passage has a circular cross-section.

In addition to one or more of the features described herein the body is formed from a porous material, the at least one passage comprising a plurality of passages defined between interstitial spaces in the porous material.

In addition to one or more of the features described herein one the plurality of support members extends across the second surface at a first angle and another of the plurality of support members extends across the second surface at a second angle, the at least one passage being a tapered passage.

In addition to one or more of the features described herein the tapered passage includes an inlet and an outlet, the tapered passage converging from the inlet to the outlet.

In addition to one or more of the features described herein one of the plurality of support members is formed from a first plurality of angled fins spaced one, from another, across the second surface and another of the plurality of support members is formed from a second plurality of angled fins spaced one, from another, across the second surface, the first plurality of angled fins and the second plurality of angled fins being spaced one from another by the at least one passage.

A vehicle, in accordance with a non-limiting example, includes a body, an electric motor supported in the body, and a battery pack including a battery cell supported in the body and connected to the electric motor. The battery cell including a cell can having a first wall, a second wall disposed opposite the first wall, a first side wall extending between and connecting the first wall with the second wall, and a second side wall, positioned opposite the first side wall, extending between and connecting the first wall with the second wall. The first wall, the second wall, the first side wall, and the second side wall define an electrode stack receiving zone. A vent is formed in the second wall. The vent is spaced from the first side wall and the second side wall. The vent fluidically connects the electrode stack receiving zone with an exterior of the cell can. An electrode stack is positioned in the electrode stack receiving zone. The electrode stack is spaced from of the first side wall by a channel. A cell stack support is arranged in the electrode stack receiving zone supporting the electrode stack above the second wall. The cell stack support includes at least one passage that transports gases from the channel to the vent.

In addition to one or more of the features described herein the cell stack support includes a first member including a first surface and an opposing second surface, the first surface being arranged on the second wall, and a plurality of support members extending from a first end coupled to the second surface to a second end, the at least one passage being defined between adjacent ones of the plurality of support members.

In addition to one or more of the features described herein a second member is connected to the second end of each of the plurality of support members.

In addition to one or more of the features described herein the first member includes a plurality of openings that extend through the first surface and the second surface.

In addition to one or more of the features described herein the cell stack support includes a body having a first surface and a second surface, and the at least one passage being formed in the body substantially perpendicularly to the first surface and the second surface.

In addition to one or more of the features described herein the at least one passage has a circular cross-section.

In addition to one or more of the features described herein the body is formed from a porous material, the at least one passage comprising a plurality of passages defined between interstitial spaces in the porous material.

In addition to one or more of the features described herein one the plurality of support members extends across the second surface at a first angle and another of the plurality of support members extends across the second surface at a second angle, the at least one passage being a tapered passage.

In addition to one or more of the features described herein the tapered passage includes an inlet and an outlet, the tapered passage converging from the inlet to the outlet.

In addition to one or more of the features described herein one of the plurality of support members is formed from a first plurality of angled fins spaced one, from another, across the second surface and another of the plurality of support members is formed from a second plurality of angled fins spaced one, from another, across the second surface, the first plurality of angled fins and the second plurality of angled fins being spaced one from another by the at least one passage.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
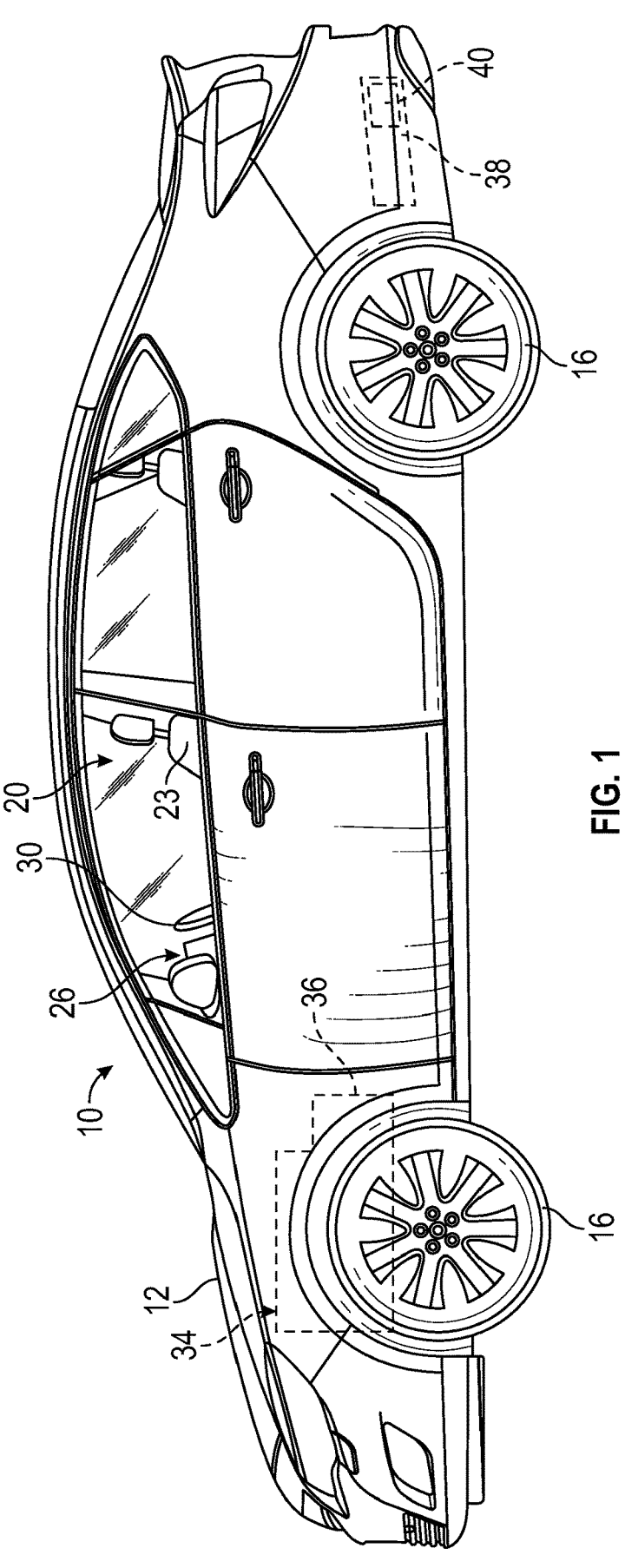
FIG. 1 is a left side view of a vehicle including a battery pack having a battery cell including a cell stack support, in accordance with a non-limiting example.

The following description is merely exemplary in nature and is not intended to limit the present disclosure, its application or uses. It should be understood that throughout the drawings, corresponding reference numerals indicate like or corresponding parts and features.

A vehicle, in accordance with a non-limiting example, is indicated generally at 10 in FIG. 1. Vehicle 10 includes a body 12 supported on a plurality of wheels 16. One or more of the plurality of wheels 16 are steerable. Body 12 defines, in part, a passenger compartment 20 having seats 23 positioned behind a dashboard 26. A steering control 30 is arranged between seats 23 and dashboard 26. Steering control 30 is operated to control orientation of the steerable wheel(s).

Figure 2:
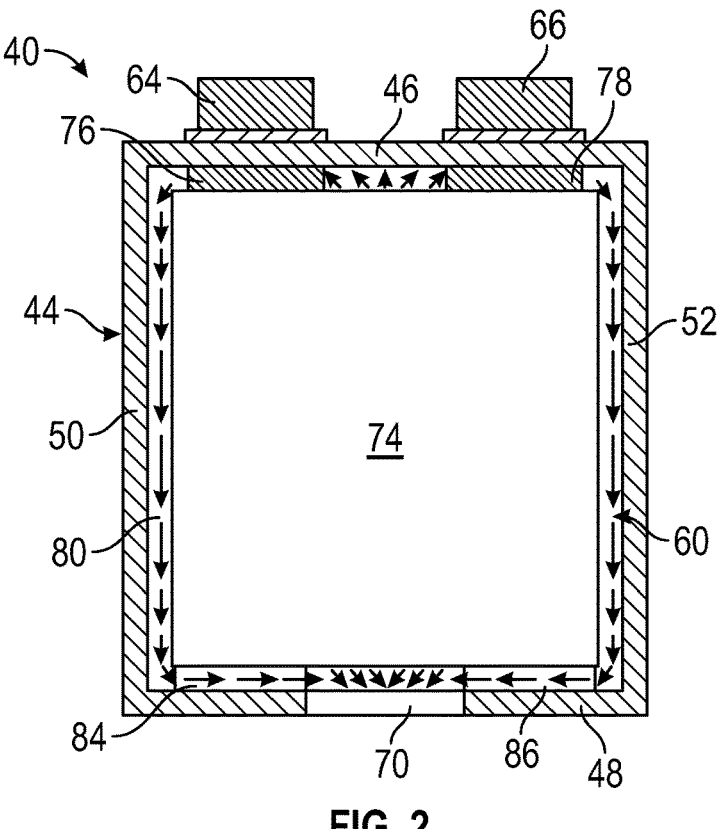
FIG. 2 is a front cross-sectional view of the battery cell having a cell stack support, in accordance with a non-limiting example.
Figure 3:
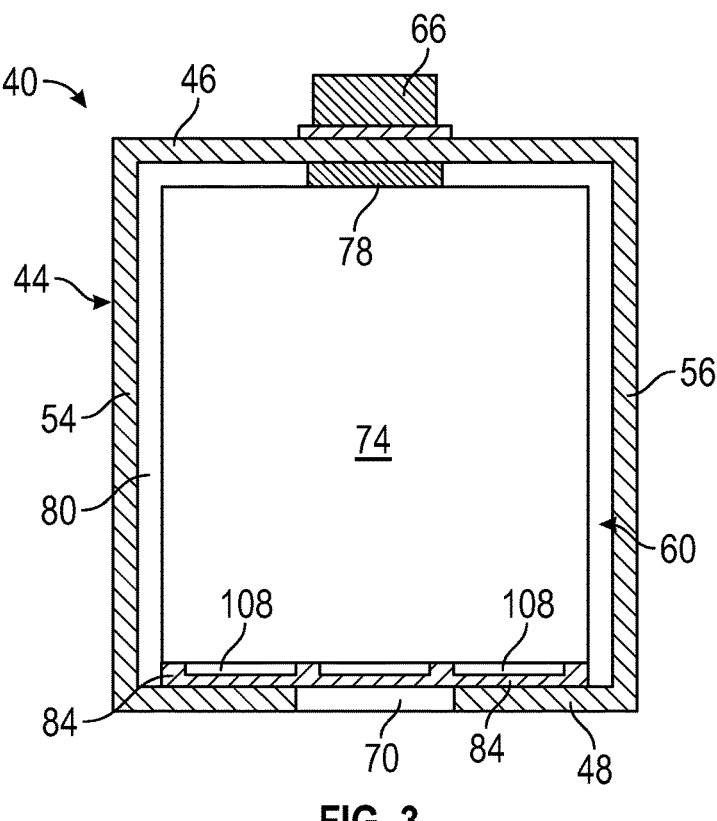
FIG. 3 is an end view of the battery cell of FIG. 2, in accordance with a non-limiting example.

Vehicle 10 includes an electric motor 34 connected to a transmission 36 that provides power to one or more of the plurality of wheels 16. A rechargeable energy storage system (RESS) 38 is arranged in body 12 and provides power to electric motor 34. At this point, it should be understood that the location of electric motor 34, transmission 36, and RESS 38 in body 12 may vary. RESS 38 has a battery pack 40 that includes a plurality of cell cans 44 one of which is shown in FIGS. 2 and 3. At this point, it should be understood that battery pack 40 includes a plurality of battery modules (not shown) each formed from a plurality of battery cells (also not shown) having a cell can 44.

In a non-limiting example, cell can 44 includes a first wall 46 and a second wall 48. A plurality of side walls including a first side wall 50, a second side wall 52, a third side wall 54 (FIG. 3), and a fourth side wall 56 (FIG. 3) extend between and connect first wall 46 and second wall 48. First wall 46, second wall 48, and side walls 50, 52, 54, and 56 define an electrode stack receiving zone 60. In the non-limiting example shown, first wall 46 is a top wall that supports a first terminal 64 and a second terminal 66. First terminal 64 and second terminal 66 electrically connect to an exterior load, such as electric motor 34. Second wall 48, in the non-limiting example shown, defines a bottom wall and includes a vent 70.

In a non-limiting example, an electrode stack 74 is arranged in electrode stack receiving zone 60. Electrode stack 74 stores and releases electrical energy through first terminal 64 and second terminal 66 to, for example, electric motor 34. Toward that end, a first tab 76 and a second tab 78 provide an electrical interface between electrode stack 74 and corresponding ones of first terminal 64 and second terminal 66. In a non-limiting example, a channel 80 extends about electrode stack 74. Channel 80 provides a pathway for gases that may be generated by electrode stack 4 during charging and/or discharging from cell can 44. The gases may pass along channel 80 and escape cell can 44 through vent 70.

Figures 4, 5, 6:
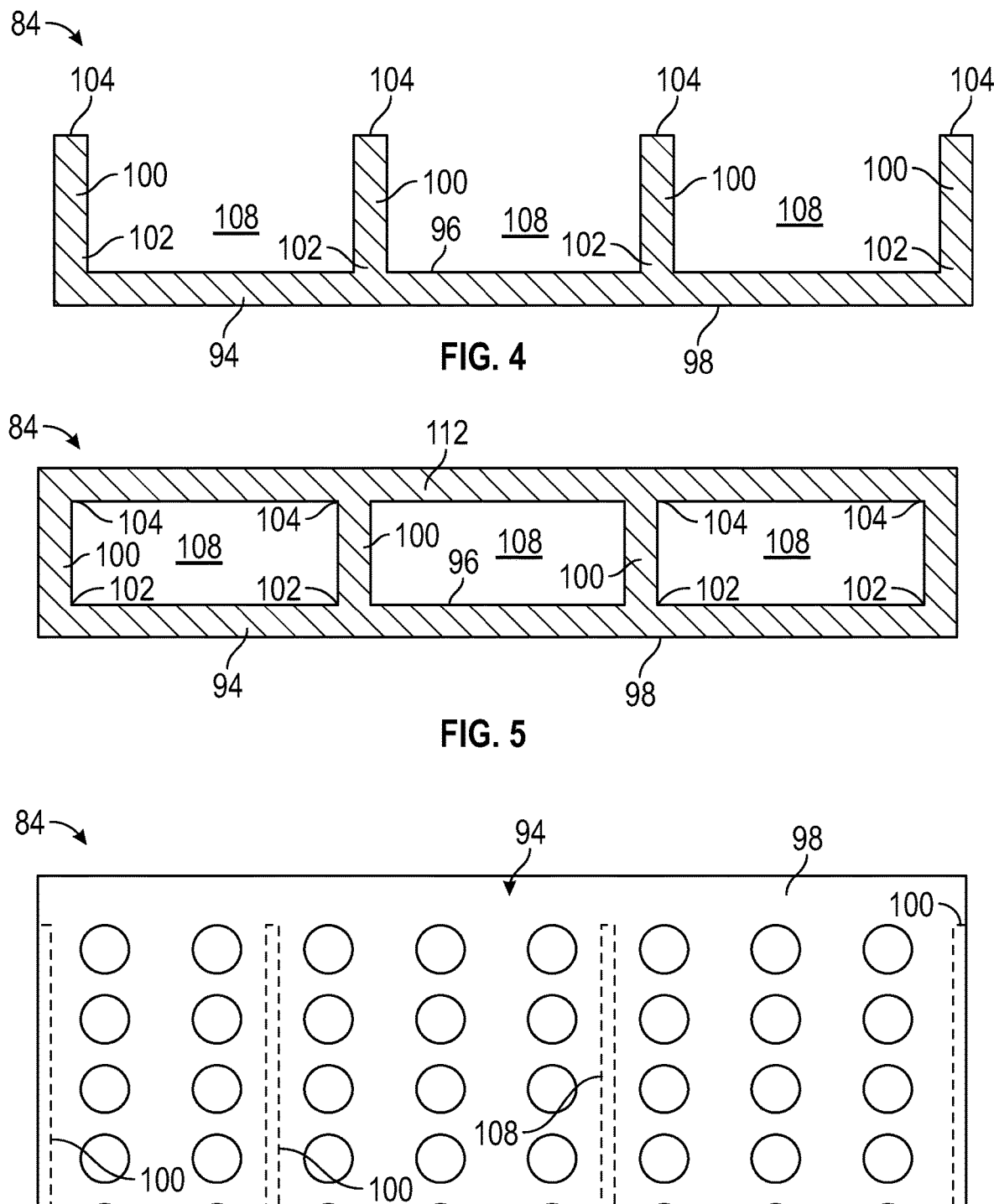
FIG. 4 is an end view of a cell stack support, in accordance with a non-limiting example.
FIG. 5 is an end view of a cell stack support, in accordance with another non-limiting example.
FIG. 6 is a top view of a cell stack support, in accordance with a non-limiting example.

In a non-limiting example, electrode stack 74 is supported above second wall 48 by a cell stack support 84. At this point, it should be appreciated that the number, arrangement, and relative thickness of cell stack supports may vary. Reference will follow to FIG. 4 in describing cell stack support 84. Cell stack support 84 includes a first member 94 having a first surface 96 and a second surface 98. Second surface 98 is opposite to first surface 96.

A plurality of support members 100 project outwardly of first surface 96. Support members 100 extend substantially perpendicularly relative to first member 94. Each support member 100 includes a first end 102 coupled to first surface 96 and a second end 104. In the non-limiting example shown, second end 104 is cantilevered from first surface 96. Support members 100 are spaced one from another so as to create passages 108 when supporting electrode stack 74. Passages 108 guide gases that may escape electrode stack 74 to vent 70. The number and arrangement of passages 108 may vary.

As shown in FIG. 5, cell stack support 84 may also include a second member 112 coupled to second end 104. With this arrangement, electrode stack 74 may rest on second member 112. In FIG. 6, first member 94 is shown to include a plurality of openings that fluidically connect electrode stack receiving zone 60 with passages 108 in order to further enhance venting of gasses that may escape electrode stack 74 during charging and discharging cycles or a thermal runaway event.

Figures 7, 8:
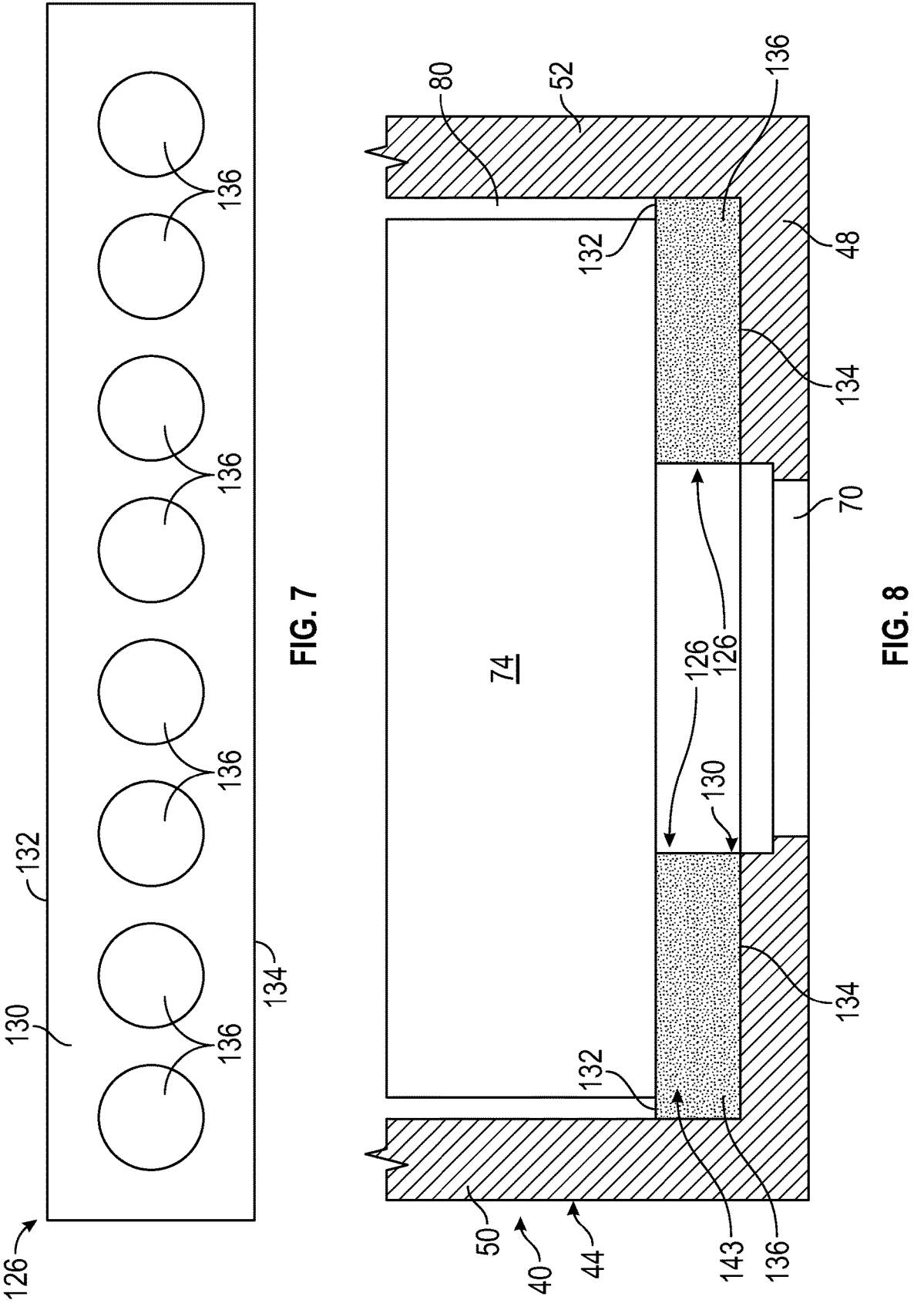
FIG. 7 is an end view of a cell stack support, in accordance with yet another non-limiting example.
FIG. 8 is an end view of a battery cell including a cell stack support, in accordance with another non-limiting example.

FIG. 7 shows a cell stack support 126 having a body 130 including a first surface 132 and a second surface 134. Second surface 134 is opposite to first surface 132. A plurality of passages 136 extend through body 130 between first surface 132 and second surface 134. Passages 136 direct gases that may escape electrode stack 74 during charging and discharging cycles or a thermal runaway event from channel 80 through vent 70 and to ambient. In the non-limiting example shown, passages 136 include a circular cross-section.

It should however be understood that the cross-section of passages 136 may take on a variety of forms and shapes including circular and non-circular geometries. Further, it should be understood that the number and arrangement of passages 136 may vary. Passages 136 may be arranged in a single row as shown, or in multiple rows. Passages 136 may be aligned with one another or may be off-set relative to one another. FIG. 8 depicts body 130 formed from a porous material 143. Porous material 143 includes a plurality of interstitial spaces that form passages for venting gases.

Figure 9:
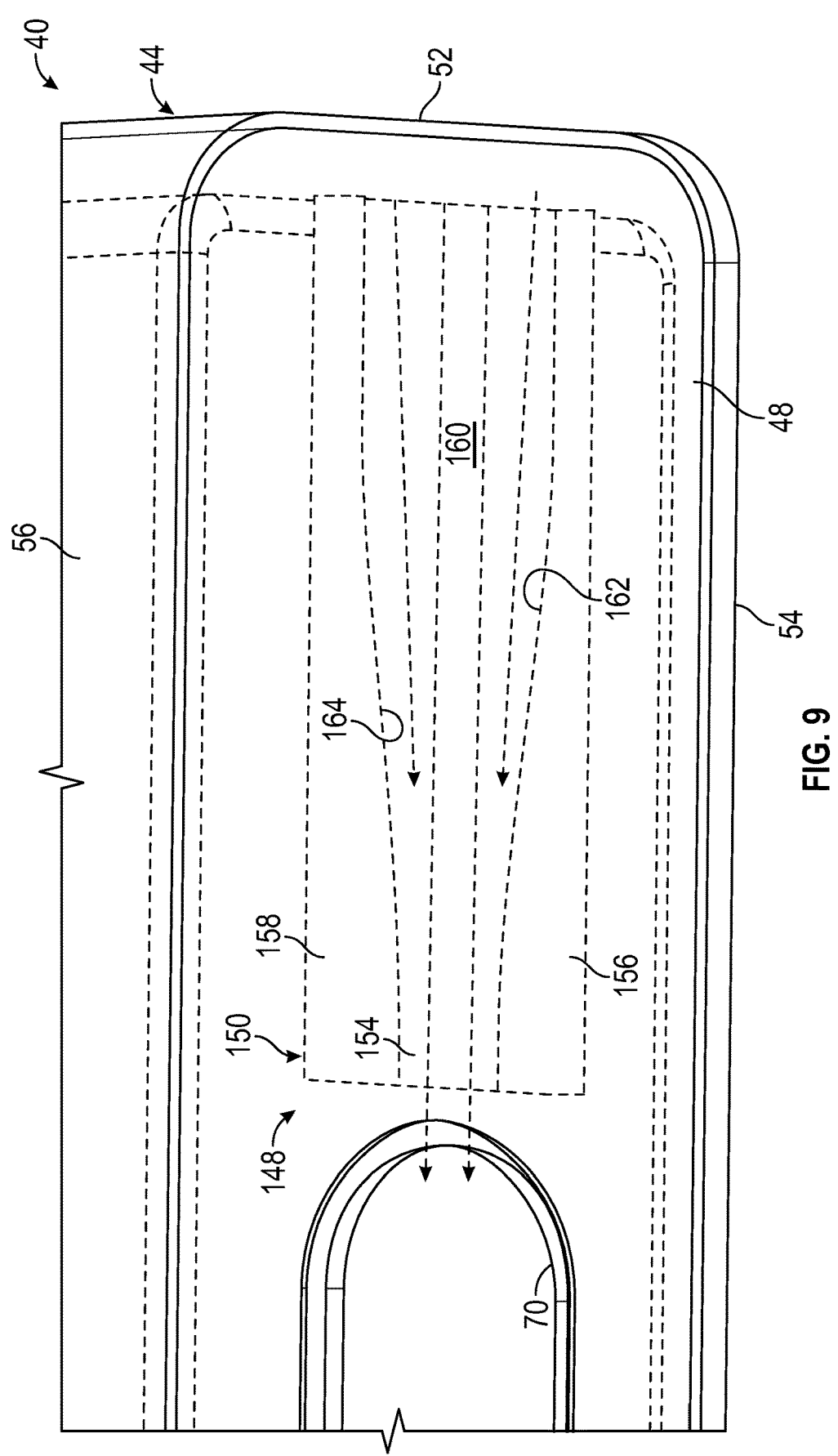
FIG. 9 is a bottom view of a cell stack support, in accordance with a non-limiting example.

FIG. 9 shows a cell stack support 148 in accordance with another non-limiting example. Cell stack support 148 includes a body 150 having a first surface (not shown) that supports electrode stack 74 and a second surface 154 that is opposite the first surface. Cell stack support 148 includes a support member 156 and a second support member 158 that extend from second surface 154. First support member 156 is spaced from second support member 158 so as to form a passage 160.

First support member 156 includes a first side surface 162 having a first angle and second support member 158 includes a second side surface 165 having a second angle. Passage 160 is defined between first side surface 162 and second side surface 165. The first angle and the second angle imparts a taper to passage 160. The taper creates a flow restriction that enhances flow velocity of gases passing from channel 80 to vent 70.

Figure 10:
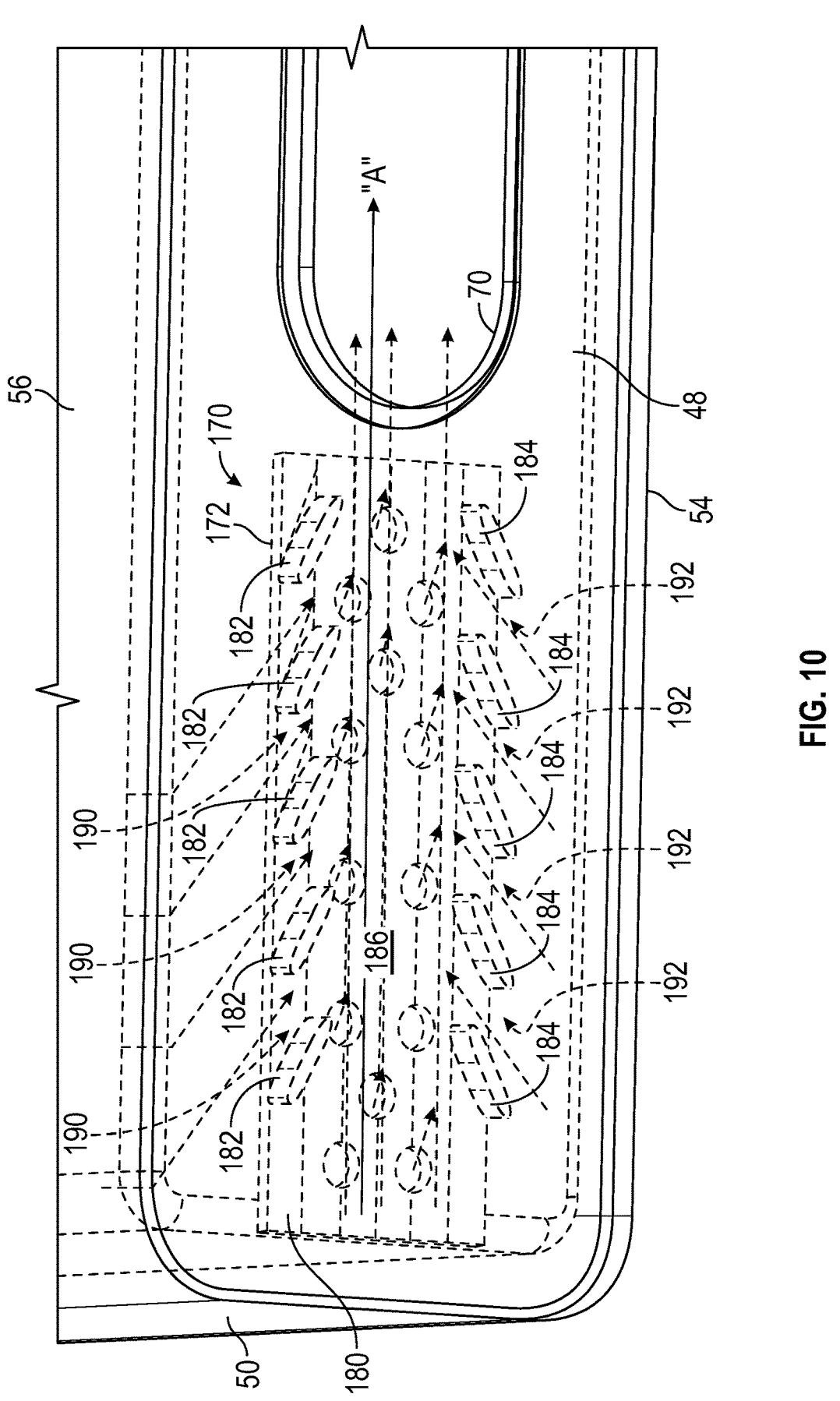
FIG. 10 is a bottom view of a cell stack support, in accordance with another non-limiting example.

In FIG. 10, a cell stack support 170 is shown to include a body 172 having a first surface (not shown) that supports electrode stack 74 and a second surface 180 that is opposite the first surface. A first plurality of support members 182 project from second surface 180 and a second plurality of support members 182 project from second surface 180 spaced from first plurality of support members 182. A central passage 186 extends between first plurality of support members 182 and second plurality of support members 184 along a central axis "A" of cell stack support 170.

The first plurality of support members 182 are spaced from one another by a first plurality of gaps 190 and the second plurality of support members 184 are spaced from one another by a second plurality of gaps 192. Each of the first plurality of support members 182 are angled relative to the central axis "A". Likewise, each of the second plurality of support members 184 are angled relative to the central axis "A". As a result of the angling of the first plurality of support members 182 and the second plurality of support members 184, each of the first plurality of gaps 190 and the second plurality of gaps 192 are angled. The angling of the first and second plurality of support members 182 and 184 creates additional flow paths that enhance flow velocity of gases passing from channel 80 to vent 70.

At this point, it should be understood that the cell stack supports in accordance with the disclosed non-limiting example, include pathways that improve venting of gases that may pass from the electrode stack during cycles of charging and discharging. The enhanced venting also aids in temperature reduction in the event that electrode stack overheats or experiences a thermal overload.

The terms "a" and "an" do not denote a limitation of quantity, but rather denote the presence of at least one of the referenced item. The term "or" means "and/or" unless clearly indicated otherwise by context. Reference throughout the specification to "an aspect", means that a particular element (e.g., feature, structure, step, or characteristic) described in connection with the aspect is included in at least one aspect described herein, and may or may not be present in other aspects. In addition, it is to be understood that the described elements may be combined in any suitable manner in the various aspects.

When an element such as a layer, film, region, or substrate is referred to as being "on" another element, it can be directly on the other element or intervening elements may also be present. In contrast, when an element is referred to as being "directly on" another element, there are no intervening elements present.

Unless specified to the contrary herein, all test standards are the most recent standard in effect as of the filing date of this application, or, if priority is claimed, the filing date of the earliest priority application in which the test standard appears.

Unless defined otherwise, technical and scientific terms used herein have the same meaning as is commonly understood by one of skill in the art to which this disclosure belongs.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A battery cell comprising:

a cell can including a first wall, a second wall disposed opposite the first wall, a first side wall extending between and connecting the first wall with the second wall, and a second side wall, positioned opposite the first side wall, extending between and connecting the first wall with the second wall, the first wall, the second wall, the first side wall, and the second side wall defining an electrode stack receiving zone;

a vent formed in the second wall, the vent being spaced from the first third wall and the second wall, the vent fluidically connecting the electrode stack receiving zone with an exterior of the cell can;

an electrode stack positioned in the electrode stack receiving zone, the electrode stack being spaced from of the first wall by a channel;

a cell stack support arranged in the electrode stack receiving zone and supporting the electrode stack above the second wall; and the cell stack support includes a first member having a first surface and an opposing second surface, the cell stack support being disposed on the second wall such that the first surface contacts the second wall and a plurality of support members extend from a first end coupled the second surface to a second end, wherein at least one passage is defined between the second surface and adjacent ones of the plurality of support members and configured to transports gases from the channel to the vent.

2. The battery cell according to claim 1, further comprising a second member connected to the second end of each of the plurality of support members.

3. The battery cell according to claim 1, wherein a plurality of openings are defined in the first member that extend through the first surface and the second surface.

4. The battery cell according to claim 1, wherein the cell stack support includes a body having a first body surface and a second body surface, and at least one body passage being formed in the body substantially between the first surface and the second surface and arranged to direct gasses from the channel to the vent.

5. The battery cell according to claim 4, wherein the at least one passage has a circular cross-section.

6. The battery cell according to claim 4, wherein the body is formed from a porous material, the at least one passage comprising a plurality of passages defined between interstitial spaces in the porous material.

7. The battery cell according to claim 1, wherein one the plurality of support members extends across the second surface at a first angle and another of the plurality of support members extends across the second surface at a second angle, the at least one passage being a tapered passage.

8. The battery cell according to claim 7, wherein the tapered passage includes an inlet and an outlet, the tapered passage converging from the inlet to the outlet.

9. The battery cell according to claim 1, wherein one of the plurality of support members is formed from a first plurality of angled fins spaced one, from another, across the second surface and another of the plurality of support members is formed from a second plurality of angled fins spaced one, from another, across the second surface, the first plurality of angled fins and the second plurality of angled fins being spaced one from another by the at least one passage.

10. A vehicle comprising:

a body;

an electric motor and a battery back supported in the body; and a battery cell supported in the battery pack and connected to the electric motor, the battery pack comprising:

a cell can including a first wall, a second wall disposed opposite the first wall, a first side wall extending between and connecting the first wall with the second wall, and a second side wall, positioned opposite the first side wall, extending between and connecting the first wall with the second wall, the first wall, the second wall, the first side wall, and the second side wall defining an electrode stack receiving zone;

a vent formed in the second wall, the vent being spaced from the first side wall and the second side wall, the vent fluidically connecting the electrode stack receiving zone with an exterior of the cell can;

an electrode stack positioned in the electrode stack receiving zone, the electrode stack being spaced from of the first side wall by a channel;

a cell stack support arranged in the electrode stack receiving zone and supporting the electrode stack above the second wall; and the cell stack support includes a first member having a first surface and an opposing second surface, the cell stack support being disposed on the second wall such that the first surface contacts the second wall and a plurality of support members extend from a first end coupled the second surface to a second end, wherein at least one passage is defined between the second surface and adjacent ones of the plurality of support members and configured to transports gases from the channel to the vent.

11. The vehicle according to claim 10, further comprising a second member connected to the second end of each of the plurality of support members.

12. The vehicle according to claim 10, wherein a plurality of openings are defined in the first member that extend through the first surface and the second surface.

13. The vehicle according to claim 10, wherein the cell stack support includes a body having a first body surface and a second body surface, and the at least one body passage being formed in the body substantially between the first surface and the second surface and arranged to direct gasses from the channel to the vent.

14. The vehicle according to claim 13, wherein the at least one passage has a circular cross-section.

15. The vehicle according to claim 13, wherein the body is formed from a porous material, the at least one passage comprising a plurality of passages defined between interstitial spaces in the porous material.

16. The vehicle according to claim 10, wherein one the plurality of support members extends across the second surface at a first angle and another of the plurality of support members extends across the second surface at a second angle, the at least one passage being a tapered passage.

17. The vehicle according to claim 16, wherein the tapered passage includes an inlet and an outlet, the tapered passage converging from the inlet to the outlet.

18. The vehicle according to claim 10, wherein one of the plurality of support members is formed from a first plurality of angled fins spaced one, from another, across the second surface and another of the plurality of support members is formed from a second plurality of angled fins spaced one, from another, across the second surface, the first plurality of angled fins and the second plurality of angled fins being spaced one from another by the at least one passage.

19. A battery cell comprising:

a cell can including a first wall, a second wall disposed opposite the first wall, a first side wall extending between and connecting the first wall with the second wall, and a second side wall, positioned opposite the first side wall, extending between and connecting the first wall with the second wall, the first wall, the second wall, the first side wall, and the second side wall defining an electrode stack receiving zone;

a vent formed in the second wall, the vent being spaced from the first wall and the second wall, the vent fluidically connecting the electrode stack receiving zone with an exterior of the cell can;

an electrode stack positioned in the electrode stack receiving zone, the electrode stack being spaced from of the first wall by a channel;

a cell stack support arranged in the electrode stack receiving zone and supporting the electrode stack above the second wall; and the cell stack support includes a body having a first surface and a second surface with a porous material disposed between the first surface and the second surface, wherein connected interstitial spaces are defined within the porous material define a plurality of passages configured to transport gasses from the channel to the vent.

* * * * *